United States Patent
Lovell

(10) Patent No.: US 11,850,636 B2
(45) Date of Patent: Dec. 26, 2023

(54) PIPE CLEANING ASSEMBLY AND METHOD OF CLEANING A PIPING SYSTEM USING THE SAME

(71) Applicant: FISHER CONTROLS INTERNATIONAL LLC, Marshalltown, IA (US)

(72) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 231 days.

(21) Appl. No.: 17/111,182

(22) Filed: Dec. 3, 2020

(65) Prior Publication Data

US 2022/0176419 A1 Jun. 9, 2022

(51) Int. Cl.
*F16K 1/44* (2006.01)
*B08B 9/032* (2006.01)
*F16K 1/48* (2006.01)

(52) U.S. Cl.
CPC ............ *B08B 9/0322* (2013.01); *F16K 1/446* (2013.01); *F16K 1/48* (2013.01)

(58) Field of Classification Search
CPC ..... B08B 9/0322; B08B 9/027; B08B 9/0321; B08B 9/0325; F16K 1/446; F16K 1/48; F16K 11/07; F16K 11/10; F16K 39/04; F16K 3/246; F16K 27/041; F16K 27/065; F16K 27/08; F16K 37/0008; F16K 47/02; F16K 1/223; F16K 11/078; B01D 35/02; Y10T 137/87378

(Continued)

(56) References Cited

U.S. PATENT DOCUMENTS

| 324,151 | A | * | 8/1885 | Panzig | F16K 11/202 |
|---|---|---|---|---|---|
| | | | | | 137/637.4 |
| 1,214,267 | A | * | 1/1917 | Block | F16K 31/0613 |
| | | | | | 137/270.5 |

(Continued)

OTHER PUBLICATIONS

Fisher™ TBX Blowdown Fixture D103207X012 Instruction Manual (Jun. 2017).

(Continued)

*Primary Examiner* — Craig J Price
*Assistant Examiner* — Andrew J Rost
(74) *Attorney, Agent, or Firm* — MARSHALL, GERSTEIN & BORUN LLP

(57) ABSTRACT

A pipe cleaning assembly has a connection fixture having a body defining a cavity. A first aperture, opposing second aperture coaxially aligned with the first aperture, first auxiliary aperture, and opposing second auxiliary aperture coaxially aligned with the first auxiliary aperture are in fluid communication with the cavity. A first connection flange extends from and surrounding the first aperture and a second connection flange extends from and surrounding the second aperture. A rotatable bonnet inserted through the second auxiliary aperture and includes a cylindrical wall having an open first end, an end wall at a second end, and a plurality of openings through the wall. An actuator is mounted to the bonnet with an actuator shaft extending through an opening in the end wall. A valve plug is secured to the actuator shaft and positioned within the bonnet.

15 Claims, 10 Drawing Sheets

(58) Field of Classification Search
USPC .............. 137/625.4–625.41, 614.16–614.18,
137/625.31–625.32, 625.46–625.47,
137/625.18–625.19, 625.21–625.24, 270,
137/270.5, 271, 637.4
See application file for complete search history.

(56) References Cited

U.S. PATENT DOCUMENTS

| | | | | |
|---|---|---|---|---|
| 4,522,233 | A * | 6/1985 | Mojadad ............... | F16K 11/083 137/625.2 |
| 5,752,690 | A * | 5/1998 | Ellett .................... | F16L 55/46 15/104.062 |
| 5,947,443 | A * | 9/1999 | Shellenbarger ....... | F16K 5/0478 251/181 |
| 6,655,658 | B2 * | 12/2003 | Neal .................... | F16K 5/0471 251/356 |
| 8,171,958 | B2 * | 5/2012 | Morreale ............... | F16K 31/50 137/637.4 |
| 8,220,488 | B2 * | 7/2012 | McCully ............... | F16K 11/085 137/614.16 |
| 8,601,634 | B1 * | 12/2013 | Stunkard ............... | F16L 55/46 15/104.062 |

OTHER PUBLICATIONS

FisherTM TBX Blowout Fixture D103206X012 Instruction Manual (Jul. 2017).

* cited by examiner

PIPE CLEANING ASSEMBLY AND METHOD OF CLEANING A PIPING SYSTEM USING THE SAME

FIELD OF THE DISCLOSURE

This disclosure relates generally to the cleaning of piping systems and, more particularly, to pipe cleaning assemblies for use in cleaning piping systems.

BACKGROUND

Cleaning process plant piping systems is required before a new plant can be commissioned and manufacturers of large rotating equipment such as turbines and compressors usually define the cleanliness level required, as incomplete cleaning of the piping system can result in costly damage and/or premature wear of turbines, compressors, pumps, or other large equipment. The cleaning process is often engineered by either an EPC contractor or a firm that specializes in cleaning services and, typically, temporary piping, valves, and hoses are installed to clean the piping system. The piping system is then pressurized and, once a specified pressure has been reached, the piping system is vented. This process is repeated until the piping system reaches the desired level of cleanliness.

Often the cleaning contractor will need to weld pipe connections to the piping system for the temporary piping. After the cleaning process these pipe connections will be removed and the piping system will be repaired. However, this process is time consuming, expensive, and any work done to the system after the cleaning process can potentially re-contaminate the piping system.

In addition, control valves often require noise reducing valve trim to meet specified noise limits, which is achieved by breaking the flow into many small jets using a trim element with many small passages. These small passages are susceptible to plugging if any particulate is present in the flow stream. In addition, as the valve plug in these control valves is moved to close the valve, debris caught in the control valve can resulting in damage to the valve.

BRIEF SUMMARY OF THE DISCLOSURE

In accordance with one exemplary aspect of the present invention, a pipe cleaning assembly comprises a connection fixture comprising a body defining a cavity. A first aperture, an opposing second aperture coaxially aligned with the first aperture, a first auxiliary aperture, and an opposing second auxiliary aperture coaxially aligned with the first auxiliary aperture are in fluid communication with the cavity. A first connection flange extends from and surrounds the first aperture and a second connection flange extends from and surrounds the second aperture. A rotatable bonnet is inserted through the second auxiliary aperture, positioned within the cavity of the body, and is accessible from outside the connection fixture. The bonnet includes a generally cylindrical wall having an open first end and a second end, an end wall at the second end of the cylindrical wall, and a plurality of openings formed through the cylindrical wall to direct fluid flowing through the connection fixture. An actuator is mounted to the bonnet and has an actuator shaft that extends through an opening in the end wall of the bonnet. A valve plug is secured to the actuator shaft and is positioned within the bonnet such that the valve plug is movable within the bonnet between a first position, in which the valve plug allows fluid flow through the bonnet, and a second position, in which the valve prevents fluid flow through the bonnet.

In further accordance with any one or more of the foregoing exemplary aspects of the present invention, a pipe cleaning assembly may further include, in any combination, any one or more of the following preferred forms.

In one preferred form, the bonnet is rotatable between a plurality of positions to create a plurality of different flow paths, the flow paths comprising: a first flow path in which the bonnet allows fluid flow between the first aperture and the second aperture; a second flow path in which the bonnet allows fluid flow between the first aperture and the first auxiliary aperture and prevents fluid flow to the second aperture; and a third flow path in which the bonnet allows fluid flow between the second aperture and the first auxiliary aperture and prevents fluid flow to the first aperture.

In another preferred form, the plurality of openings include only a first opening having a first axis, an opposing second opening having a second axis coaxially aligned with the first axis of the first opening, and a third opening having a third axis perpendicular to the first axis and the second axis.

In another preferred form, the pipe cleaning assembly comprises a plate secured to the connection fixture over the first auxiliary aperture to prevent fluid flow through the first auxiliary aperture and the bonnet is positioned to direct fluid between the first aperture and the second aperture and prevent fluid flow through the second auxiliary aperture.

In another preferred form, the bonnet is positioned to direct fluid between the first aperture, the second aperture, and the first auxiliary aperture and prevent fluid flow through the second auxiliary aperture.

In another preferred form, the bonnet is positioned to direct fluid between the first aperture and the first auxiliary aperture and prevent fluid flow through the second aperture and the second auxiliary aperture.

In another preferred form, the bonnet is positioned to direct fluid between the second aperture and the first auxiliary aperture and prevent fluid flow through the first aperture and the second auxiliary aperture.

In another preferred form, the bonnet is rotatable within the connection fixture to select a flow path without removing the bonnet from the connection fixture.

In another preferred form, the end wall of the bonnet is configured to receive a tool to rotate the bonnet.

In another preferred form, the end wall comprises a protrusion having opposing, parallel, planar sides to receive the tool.

In accordance with another exemplary aspect of the present invention, a pipe cleaning assembly comprises a connection fixture comprising a body defining a cavity. A first aperture, an opposing second aperture coaxially aligned with the first aperture, a first auxiliary aperture, and an opposing second auxiliary aperture coaxially aligned with the first auxiliary aperture are in fluid communication with the cavity. A first connection flange extends from and surrounds the first aperture and a second connection flange extends from and surrounds the second aperture. A rotatable bonnet is inserted through the second auxiliary aperture, positioned within the cavity of the body, and is accessible from outside the connection fixture. The bonnet includes a generally cylindrical wall having an open first end and a second end, an end wall at the second end of the cylindrical wall, and a plurality of openings formed through the cylindrical wall to direct fluid flowing through the connection fixture. A filter assembly is positioned within the bonnet.

In further accordance with any one or more of the foregoing exemplary aspects of the present invention, a pipe cleaning assembly may further include, in any combination, any one or more of the following preferred forms.

In one preferred form, the plurality of openings include only a first opening having a first axis, an opposing second opening having a second axis coaxially aligned with the first axis of the first opening, and a third opening having a third axis perpendicular to the first axis and the second axis.

In another preferred form, a plate is secured to the connection fixture over the first auxiliary aperture to prevent fluid flow through the first auxiliary aperture and the bonnet is positioned to direct fluid between the first aperture and the second aperture and prevent fluid flow through the second auxiliary aperture.

In another preferred form, the filter assembly comprises a cylindrical top plate, a cylindrical bottom plate, a planar first wall extending between the top plate and the bottom plate and having a first plurality of apertures formed therethrough, a planar second wall extending between the top plate and the bottom plate and having a second plurality of apertures formed therethrough. A longitudinal edge of the first wall is coincident with a longitudinal edge of the second wall and the second wall extends away from the first wall at an angle such that fluid flow between the first aperture and the second aperture flows through the first wall or the second wall.

In another preferred form, the first wall is hollow and forms a first cavity, the second wall is hollow and forms a second cavity, and the cylindrical top plate has a first slot aligned with the first cavity and a second slot aligned with the second cavity.

In another preferred form, a first filter screen is removably positioned in the first cavity of the first wall and has a plurality of apertures that are smaller than the first plurality of apertures of the first wall and a second filter screen is removably positioned in the second cavity of the second wall and has a plurality of apertures that are smaller than the second plurality of apertures of the second wall.

In another preferred form, the first filter screen is insertable and removable from the first cavity through the first slot and the second filter screen is insertable and removable from the second cavity through the second slot.

In another preferred form, the filter assembly includes a stem extending from the top plate and through an aperture in the end wall of the bonnet.

In another preferred form, a plate is positioned on the stem and adjacent the bonnet and a nut is threaded onto the stem to retain the filter assembly in the bonnet.

In another preferred form, the bonnet is rotatable within the connection fixture to select a flow path without removing the bonnet from the connection fixture.

DETAILED DESCRIPTION

Protection of control valves and other sensitive equipment during hydrostatic testing and cleaning of a piping system is of critical importance to successful plant operation. The example pipe cleaning assemblies shown and described herein can be configured to allow multiple modes of cleaning, and in some examples flow control function, and enable more thorough and economical cleaning of a newly fabricated piping system and prevent damage to control valve trim, rotating equipment, and other sensitive devices used within the process industries. The pipe cleaning assemblies have the same dimensions as the control valves or other equipment that they replace in the piping system and use flanges to connect to the piping system, rather than being welded in, which avoids contamination of the piping system after cleaning when the pipe cleaning assemblies are removed and the control valve or other equipment is installed. The flow capacity and noise reduction capability can also be adjusted to mimic that of the control valve or other equipment to provide realistic operation of the piping system prior to installation of the control valve or other equipment. The modular design allows the pipe cleaning assemblies to use of the same basic connection fixture and to be quickly configured to allow different cleaning modes to be selected without disassembling or rebuilding the assembly, for example, by merely rotating a bonnet within the assembly. This saves time and reduces labor by offering quick-change cleaning mode selection.

Figure 1:
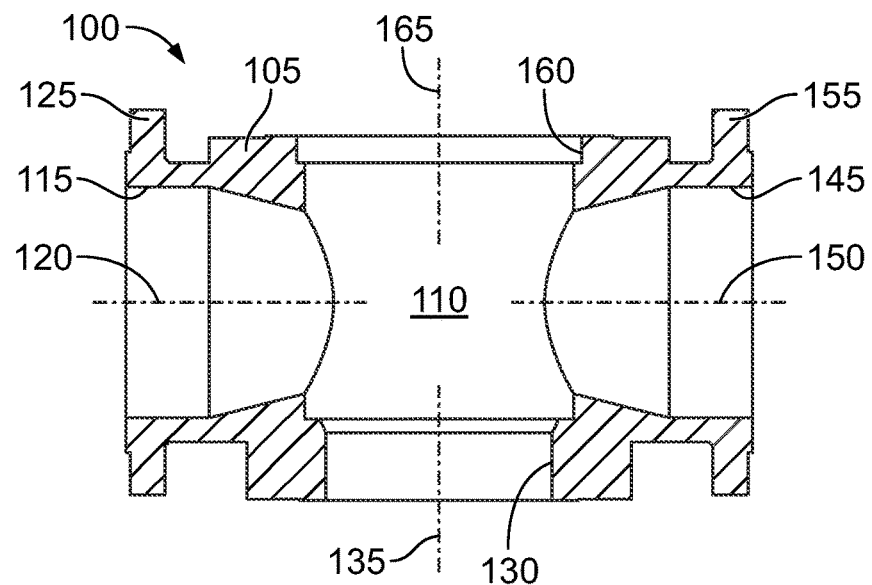
FIG. 1 is a side cross-sectional view of an example connection fixture.
Figure 2:
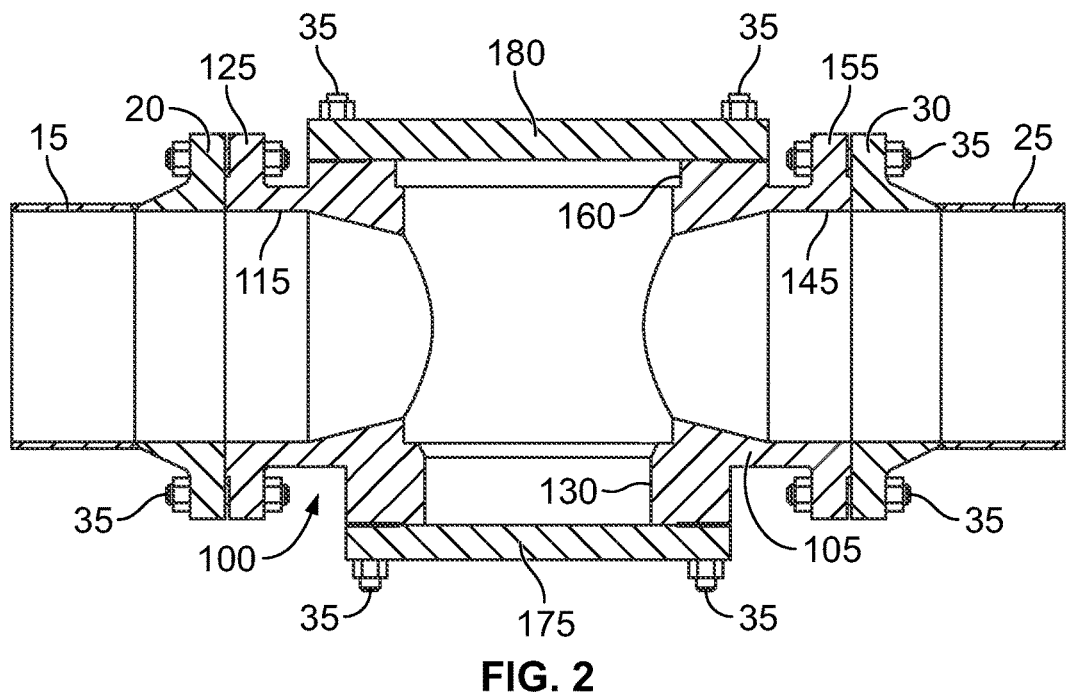
FIG. 2 is the connection fixture of FIG. 1 configured for hydrostatic testing.

Referring to FIG. 1, an example connection fixture 100 is shown that can be used in place of a linear valve, such as a globe style valve, or other sensitive component during hydrostatic testing and cleaning of the piping system to avoid damage to the valve/sensitive component and eliminates the need for temporary pipe connections or access points to be installed for pipe cleaning purposes. Connection fixture 100 can be manufactured using 3D sand printing, which reduces cost and allows connection fixture 100 to be custom engineered for each order, and has a body 105 that defines a cavity 110 and first and second opposing apertures 115, 145 formed through body 105 and in fluid communication with cavity 110. In the example shown, since connection fixture 100 is configured to replace a linear valve, first aperture 115 has an axis 120 that is coaxially aligned with an axis 150 of second aperture 145. First and second connection flanges 125, 155 extend from and surround first and second apertures 115, 145, respectively, to allow connection fixture 100 to be removably secured to first and second pipe sections 15, 25 (see FIG. 2) in place of a valve or other component, without any welding or cutting of the piping system, which can create additional contaminants in the piping system during installation and removal. First and second connection flanges 125, 155 match the flanged ends of the control valve so that connection fixture 100 can be installed in place of the control valve in the piping system, which allows the piping system to be accurately fabricated and then hydrostatically tested while the control valve remains safely in storage. As shown in FIG. 2, first connection flange 125 can be secured to flange 20 of first pipe section 15 with threaded members 35, such as bolts and nuts, and second connection flange 155 can be secured to flange 30 of second pipe section 25 with threaded members 35. First auxiliary aperture 130 and opposing second auxiliary aperture 160 are also formed through body 105 and are in fluid communication with cavity 110. First auxiliary aperture 130 has an axis 135 that is coaxially aligned with an axis 165 of second auxiliary aperture 160.

Connection fixture 100 also supports a wide variety of optional components, as discussed in more detail below, that allow the piping system to be hydrostatically tested and economically cleaned in a number of different ways and allows the fabricators of the piping system to formulate a superior cleaning strategy customized for the particular piping system.

Referring to FIG. 2, connection fixture 100 can be secured between first pipe section 15 and second pipe section 25 of a piping system and first auxiliary aperture 130 and second auxiliary aperture 160 can be fitted with blind flanges for hydrostatic pressure testing of the piping system. A first plate 175 (blind flange) can be positioned over first auxiliary aperture 130 and secured to body 105, for example with threaded members 35, to prevent fluid flow through first auxiliary aperture 130. A second plate 180 (blind flange) can also be positioned over second auxiliary aperture 160 and secured to body 105, for example with threaded members 35, to prevent fluid flow through second auxiliary aperture 160. Configured in this manner, connection fixture 100 allows unrestricted flow in either direction, is completely sealed, and can be used for hydrostatic pressure testing of the piping system.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Once connection fixture 100 has been installed and first and second plates 175, 180 secured over first and second auxiliary apertures 130, 160, pressurized fluid can flow through piping system to hydrostatically test and/or clean the piping system. Once the testing and/or cleaning is complete, connection fixture 100 can be removed and the control valve can be installed between first pipe section 15 and second pipe section 25. This process allows the piping system to be cleaned without risking wear or damage to the control valve during the cleaning process.

Cleaning of the piping system can be done it a variety of ways as described in ASME B31.3, Appendix A, such as water flush, steam blow, or air blow. Depending on the cleaning method used, connection fixture 100 can be configured to remove debris from the piping system by removing first and/or second plates 175, 180 from body 105 to allow fluid and debris to be blown out through one or both of first and/or second auxiliary apertures 130, 160 when the piping system is pressurized, which is highly advantageous for closed piping systems that have no existing vent location. Because connection fixture 100 has more capacity than the control valve it replaces, higher pipe velocities can be achieved resulting in improved cleaning of the piping system. Used in this manner, connection fixture 100 allows any debris within the piping system to flow through connection fixture 100. If desired, the flow coefficient (Cu) of connection fixture 100 can be adjusted to meet the needs of the designer of the cleaning procedure.

Figure 3:
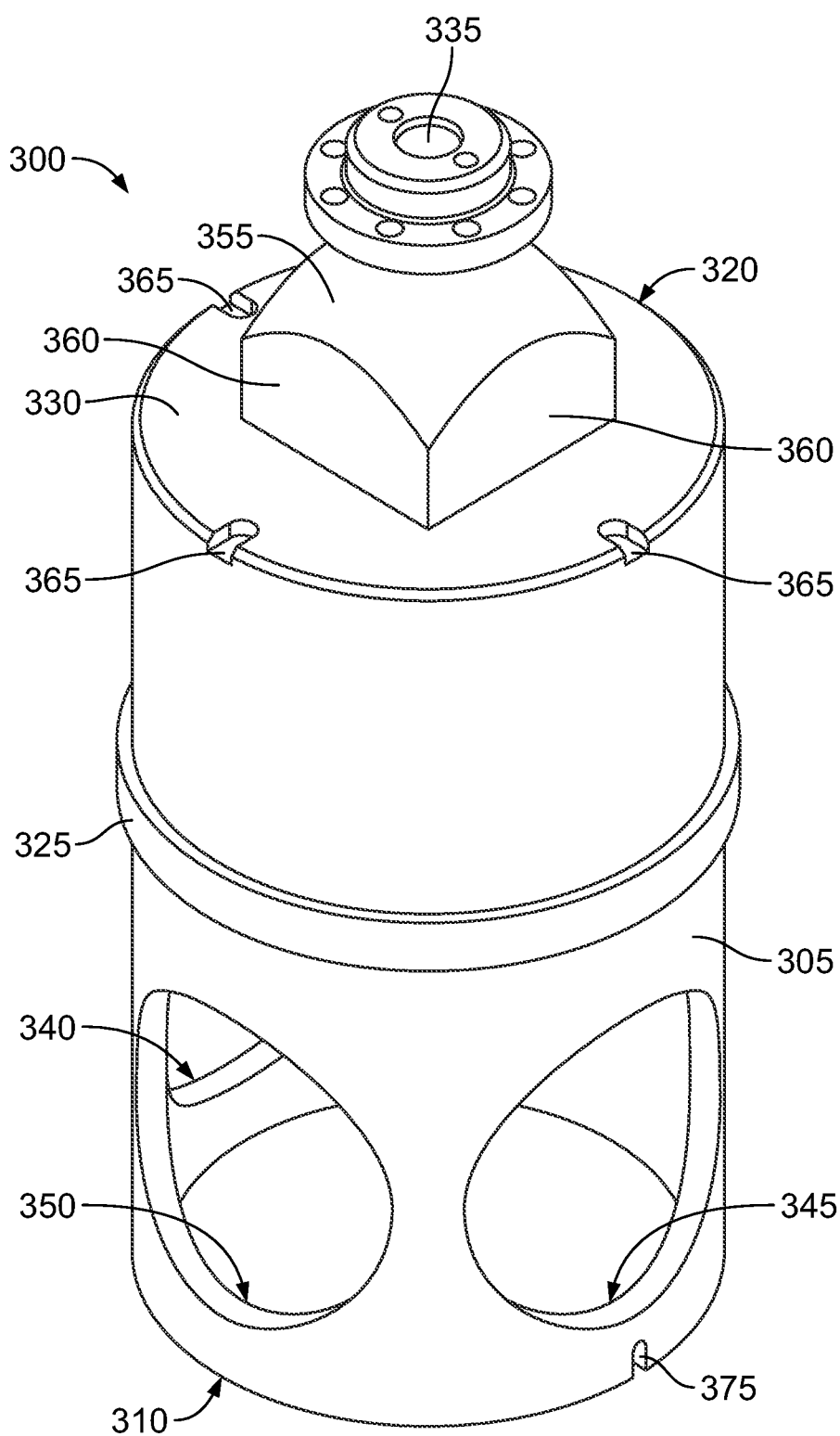
FIG. 3 is a perspective view of an example bonnet that can be used with the connection fixture of FIG. 1.

Referring to FIG. 3, an example bonnet 300 is shown that can also be used with connection fixture 100. Bonnet 300 has a generally cylindrical wall 305 that has an open first end 310 and a closed second end 320 that is closed off by end wall 330. The outside diameter of wall 305 of bonnet 300 is closely matched to the inside diameter of second auxiliary aperture 160 of connection fixture 100. This minimal clearance provides adequate sealing of debris between body 105 of connection fixture 100 and bonnet 300. A radially extending flange 325 extends from and surrounds second end 320 and can be used to seat bonnet 300 in second auxiliary aperture 160. A plurality of openings are formed through wall 305, proximate first end 310, to direct fluid flowing through connection fixture 100. In the example shown, the plurality of openings include a first opening 340 having a first axis 342, an opposing second opening 345 having a second axis 347 coaxially aligned with first axis 342 of first opening 340 on an opposite side of wall 305, and a third opening 350 positioned between first opening 340 and second opening 345 and having a third axis 352 coaxially aligned generally perpendicular to first axis 342 and second axis 347. A protrusion 355 extends from an external surface of end wall 330 and has one or more planar surfaces 360, which are configured to engage a tool to enable bonnet 300 to be rotated within connection fixture 100 to select a flow path without removing bonnet 300 from connection fixture 100, which provides a quicker, easier, and more economical selection of a cleaning mode, preferably by rotating bonnet 300 within connection fixture 100 in 90 degree increments. For example, protrusion 355 can having opposing, parallel, planar sides that are configured to receive a tool, such as a wrench. Bonnet 300 is rotatable between different positions to create different flow paths, as described below. An opening 335 is formed through end wall 330 and protrusion 355 to receive an actuator shaft of an actuator, as described in more detail below. Bonnet 300 can also have one or more external indicators 365, for example on the external surface of end wall 330, that allow for positive external identification of the position of first, second, and third openings 340, 345, 350, and, therefore, the cleaning mode selected, without having to move bonnet 300 from connection fixture 100. In addition to, or instead of, external indicators 365, bonnet 300 could include a detent or locking mechanism to assist in the accurate positioning of bonnet 300 within connection fixture 100 so that first, second, and third openings 340, 345, 350 align correctly with the respective apertures in connection fixture 100.

Bonnet 300 can be manufactured as a separate parts and attached together or can be manufactured as one single, integral, unitary part using Additive Manufacturing Technology, such as direct metal laser sintering, full melt powder bed fusion, etc. Using an Additive Manufacturing Technology process, the 3-dimensional design of the desired structure is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed structure.

In addition to directing the flow path, it may also be desirable to limit the flow rate through connection fixture 100. In addition to selecting the cleaning mode, bonnet 300 can be rotated within connection fixture 100 to adjust the maximum $C_v$ and offset first, second, and third openings 340, 345, 350, from the apertures to create a restriction between bonnet 300 and connection fixture 100.

Figure 4:
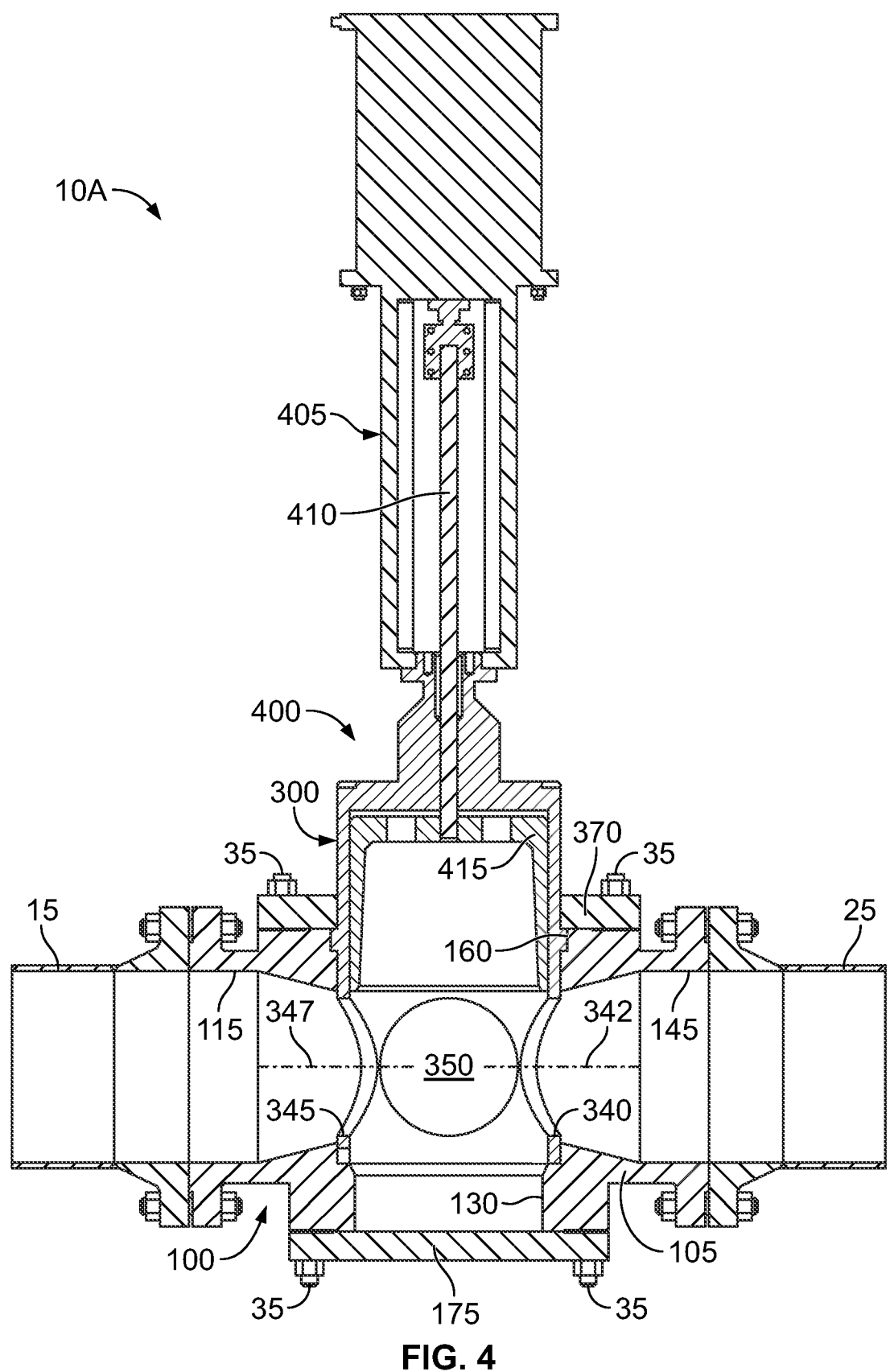
FIG. 4 is a side cross-sectional view of a first example pipe cleaning assembly including the connection fixture of FIG. 1 and the bonnet of FIG. 3.

Referring to FIG. 4, a first example pipe cleaning assembly 10A is shown that uses connection fixture 100 and a bonnet assembly 400 and can be used to clean the piping system and allow unrestricted flow in the normal direction of the control valve. Bonnet assembly 400 includes bonnet 300, actuator 405, and valve plug 415, provides throttling control of the fluid flow through connection fixture 100 in all cleaning modes, and provides rapid opening in all cleaning modes to temporarily create high pressure and velocity to improved cleaning. Actuator 405 is mounted to bonnet 300, for example to protrusion 355, and has actuator shaft 410 that extends through opening 335 in end wall 330 and protrusion 355 of bonnet 300. Actuator 405 can be any type of manual or automatic actuator that can move actuator shaft 410 linearly along a longitudinal axis of actuator shaft 410. Valve plug 415 is secured to an end of actuator shaft 410 and is positioned within bonnet 300 such that valve plug 415 is movable within bonnet 300 between a first position, in which valve plug 415 allows fluid flow through bonnet 300, and a second position, in which valve plug 415 prevents fluid flow through bonnet 300. In addition to the first (open) and second (closed) positions, valve plug 415 can also be positioned in any number of intermediate positions between the first and second positions to limit the flow rate through connection fixture 100.

In pipe cleaning assembly 10A, bonnet 300 of bonnet assembly 400 is inserted through second auxiliary aperture 160 of connection fixture 100, is positioned within cavity 110 of body 105, and is secured in place by a ring plate 370 that is connected to body 105 and secures flange 325 between body 105 and ring plate 370 so that bonnet 300 is accessible from outside connection fixture 100. Bonnet 300 can be positioned in a first position such that second opening 345 is generally aligned with first aperture 115, first opening 340 is generally aligned with second aperture 145, third opening 350 is blocked by body 105, and open first end 310 is generally aligned with first auxiliary aperture 130 or a fourth position such that first opening 340 is generally aligned with first aperture 115, second opening 345 is generally aligned with second aperture 145, third opening 350 is blocked by body 105, and open first end 310 is generally aligned with first auxiliary aperture 130. Positioning bonnet 300 in the first or fourth positions creates a first flow path, which allows fluid flow between first aperture 115 and second aperture 145 and prevents fluid flow through second auxiliary aperture 160. First plate 175 is also secured to connection fixture 100 over first auxiliary aperture 130 to prevent fluid flow through first auxiliary aperture 130.

Because connection fixture 100 has more capacity than the control valve it replaces, higher pipe velocities can be achieved resulting in improved cleaning of the piping system. Pipe cleaning assembly 10A allows any debris within the piping system to flow through connection fixture 100. If desired the flow coefficient ($C_v$) of pipe cleaning assembly 10A can also be adjusted to meet the needs of the designer of the cleaning procedure, for example, by rotating bonnet 300 as described above or through the position of valve plug 415, controlled by actuator 405, controlling the $C_v$. If desired, pipe cleaning assembly 10A can also flow in the reverse direction (e.g., from second aperture 145 to first aperture 115).

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300 such that valve plug 415 is movable within bonnet 300, as described above. Actuator 405 is mounted to bonnet 300 such that actuator shaft 410 extends through opening 335 and actuator shaft 410 is secured to valve plug 415 to move valve plug 415 within bonnet 300. Bonnet 300 is installed through second auxiliary aperture 160 and into cavity 110 of body 105 and is positioned in the first or fourth position such that bonnet 300 directs fluid between first aperture 115 and second aperture 145 and prevents fluid flow to second auxiliary aperture 160. First plate 175 is positioned over first auxiliary aperture 130 and connected to body 105 to seal first auxiliary aperture 130. Ring plate 370 is connected to body 105 to secure bonnet 300 within connection fixture 100. If already installed, threaded members 35 can be loosened, without removing ring plate 370, bonnet 300 is then rotated within connection fixture 100 to the first or fourth position, without removing bonnet 300 from the connection fixture 100, and threaded members 35 are tightened secure ring plate 370 and position bonnet 300 in the first or fourth position. Valve plug 415 could be moved to the second (closed) position until a pressure within the piping system reaches a predetermined pressure, and, once the predetermined pressure has been reached, valve plug 415 could be moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Rather than allowing fluid flow through connection fixture 100, it may be desirable to use connection fixture 100 to remove debris from the piping system, for example, by blowing the debris out through first auxiliary aperture 130.

Figure 5:
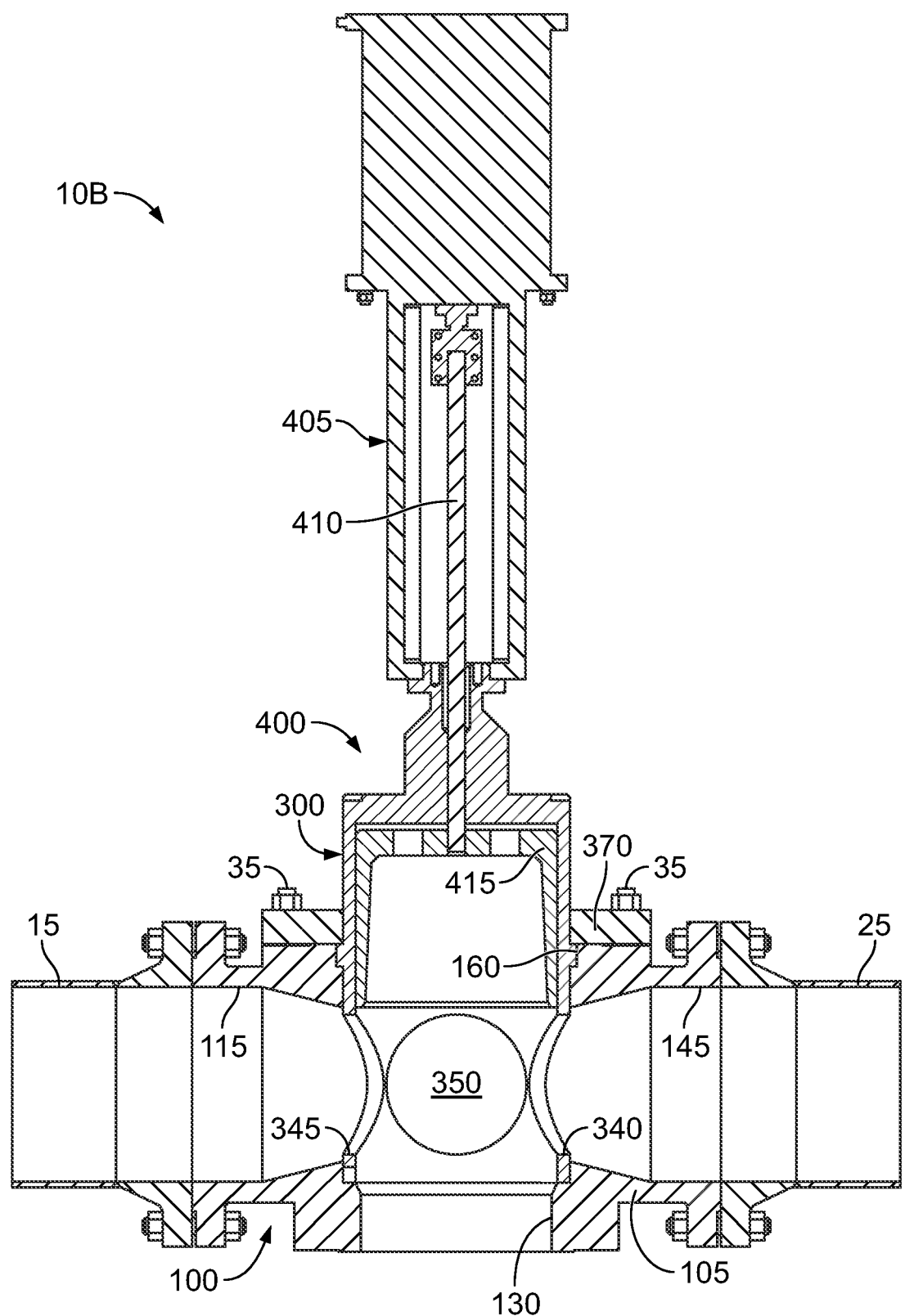
FIG. 5 is a side cross-sectional view of a second example pipe cleaning assembly including the connection fixture of FIG. 1 and the bonnet of FIG. 3.

Referring to FIG. 5, a second example pipe cleaning assembly 10B is shown that uses connection fixture 100 and bonnet assembly 400 and can be used to clean the piping system. In pipe cleaning assembly 10B, bonnet 300 of bonnet assembly 400 is inserted through second auxiliary aperture 160 of connection fixture 100, is positioned within cavity 110 of body 105, and is secured in place by ring plate 370, as described above. Bonnet 300 can be positioned in the first or fourth position, as described above, and first auxiliary aperture 130 can be left uncovered. This configuration allows fluid flow and debris to be blown out of the piping system through first auxiliary aperture 130 when the piping system is pressurized, which is highly advantageous for closed piping systems that have no existing vent locations. However, this method of cleaning requires a large amount of steady state flow, which is often not available. In these situations, valve plug 415 can be moved to the second (closed) position to block fluid flow through connection fixture 100 and allow the pressure within the piping system to increase. Once a target pressure has been reached, valve plug 415 can be rapidly moved to the first (open) position by actuator 405 to depressurized the piping system and allow fluid flow and debris to be blown out of the piping system through first auxiliary aperture 130 at high flow rates. This technique allows the piping system to be pressurized with a relatively small compressor and yet high flow rates can be achieved.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300 such that valve plug 415 is movable within bonnet 300, as described above. Actuator 405 is mounted to bonnet 300 such that actuator shaft 410 extends through opening 335 and actuator shaft 410 is secured to valve plug 415 to move valve plug 415 within bonnet 300. Bonnet 300 is installed through second auxiliary aperture 160 and into cavity 110 of body 105 and is positioned in the first or fourth position such that bonnet 300 directs fluid between first aperture 115, second aperture 145, and first auxiliary aperture 130 and prevents fluid flow to second auxiliary aperture 160. Ring plate 370 is connected to body 105 to secure bonnet 300 within connection fixture 100. If already installed, threaded members 35 can be loosened, without removing ring plate 370, bonnet 300 is then rotated within connection fixture 100 to the first or fourth position, without removing bonnet 300 from the connection fixture 100, and threaded members 35 are tightened secure ring plate 370 and position bonnet 300 in the first or fourth position. Valve plug 415 can be moved to the second (closed) position until a pressure within the piping system reaches a predetermined pressure. Once the predetermined pressure has been reached, valve plug 415 can be moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

In some cases it may be advantageous to clean the upstream piping (e.g., first pipe section 15) separately from the downstream piping (e.g., second pipe section).

Figure 6:
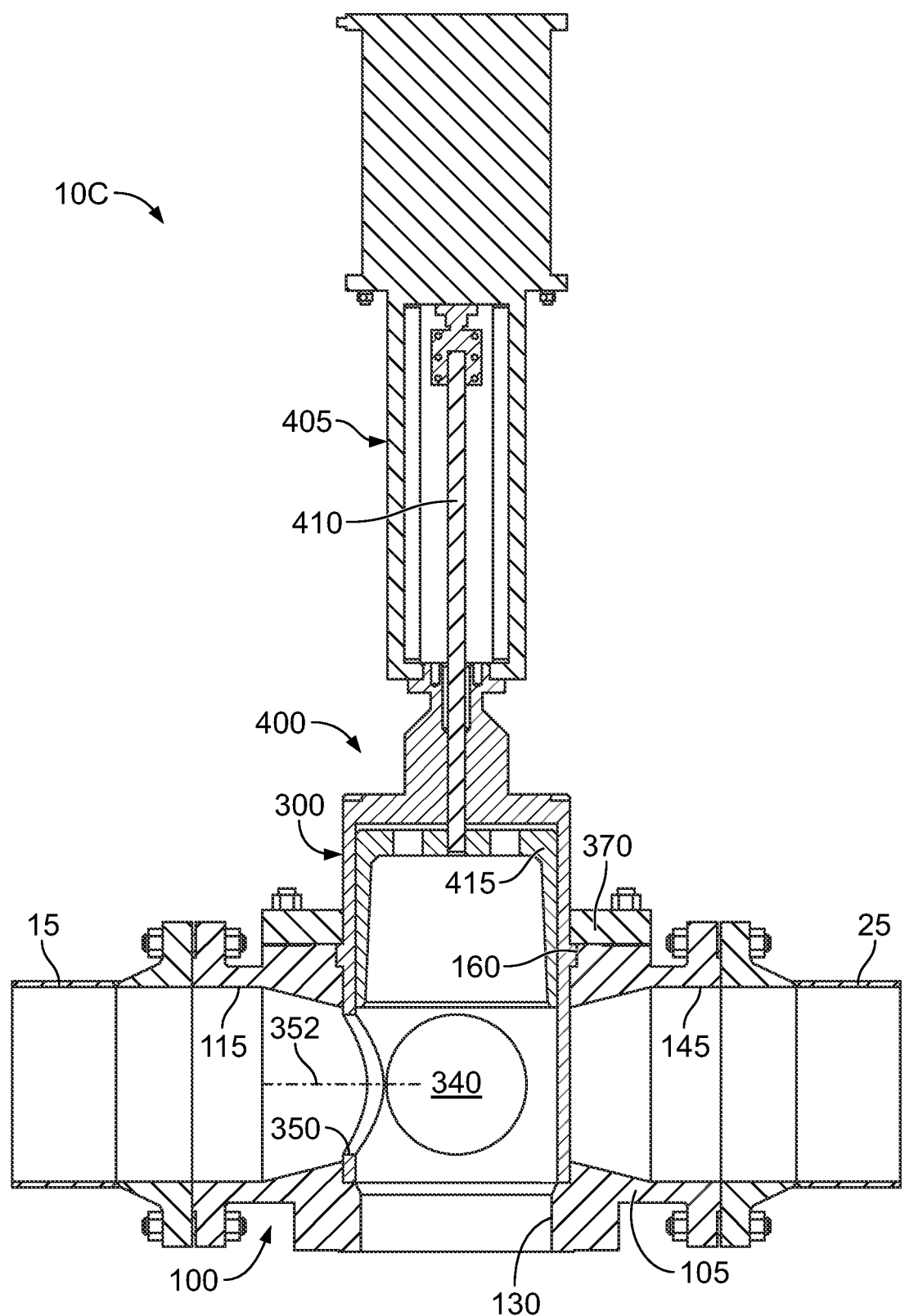
FIG. 6 is a side cross-sectional view of a third example pipe cleaning assembly including the connection fixture of FIG. 1 and the bonnet of FIG. 3.

Referring to FIG. 6, a third example pipe cleaning assembly 10C is shown that uses connection fixture 100 and bonnet assembly 400 and can be used to clean the upstream piping of the piping system. In pipe cleaning assembly 100, bonnet 300 of bonnet assembly 400 is inserted through second auxiliary aperture 160 of connection fixture 100, is positioned within cavity 110 of body 105, and is secured in place by ring plate 370, as described above. Bonnet 300 is positioned in a second position such that third opening 350 is generally aligned with first aperture 115, first opening 340 and second opening 345 are blocked by body 105, and open first end 310 is generally aligned with first auxiliary aperture 130. Positioning bonnet 300 in the second position creates a second flow path, which allows fluid flow between first aperture 115 and first auxiliary aperture 130 and prevents fluid flow to second aperture 145 and second auxiliary aperture 160.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300 such that valve plug 415 is movable within bonnet 300, as described above. Actuator 405 is mounted to bonnet 300 such that actuator shaft 410 extends through opening 335 and actuator shaft 410 is secured to valve plug 415 to move valve plug 415 within bonnet 300. Bonnet 300 is installed through second auxiliary aperture 160 and into cavity 110 of body 105 and is positioned in the second position such that bonnet 300 directs fluid between first aperture 115 and first auxiliary aperture 130 and prevents fluid flow to second aperture 145 and second auxiliary aperture 160. Ring plate 370 is connected to body 105 to secure bonnet 300 within connection fixture 100. If already installed, threaded members 35 can be loosened, without removing ring plate 370, bonnet 300 is then rotated within connection fixture 100 to the second position, without removing bonnet 300 from the connection fixture 100, and threaded members 35 are tightened secure ring plate 370 and position bonnet 300 in the second position. Valve plug 415 can be moved to the second (closed) position until a pressure within the piping system reaches a predetermined pressure. Once the predetermined pressure has been reached, valve plug 415 can be moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 7:
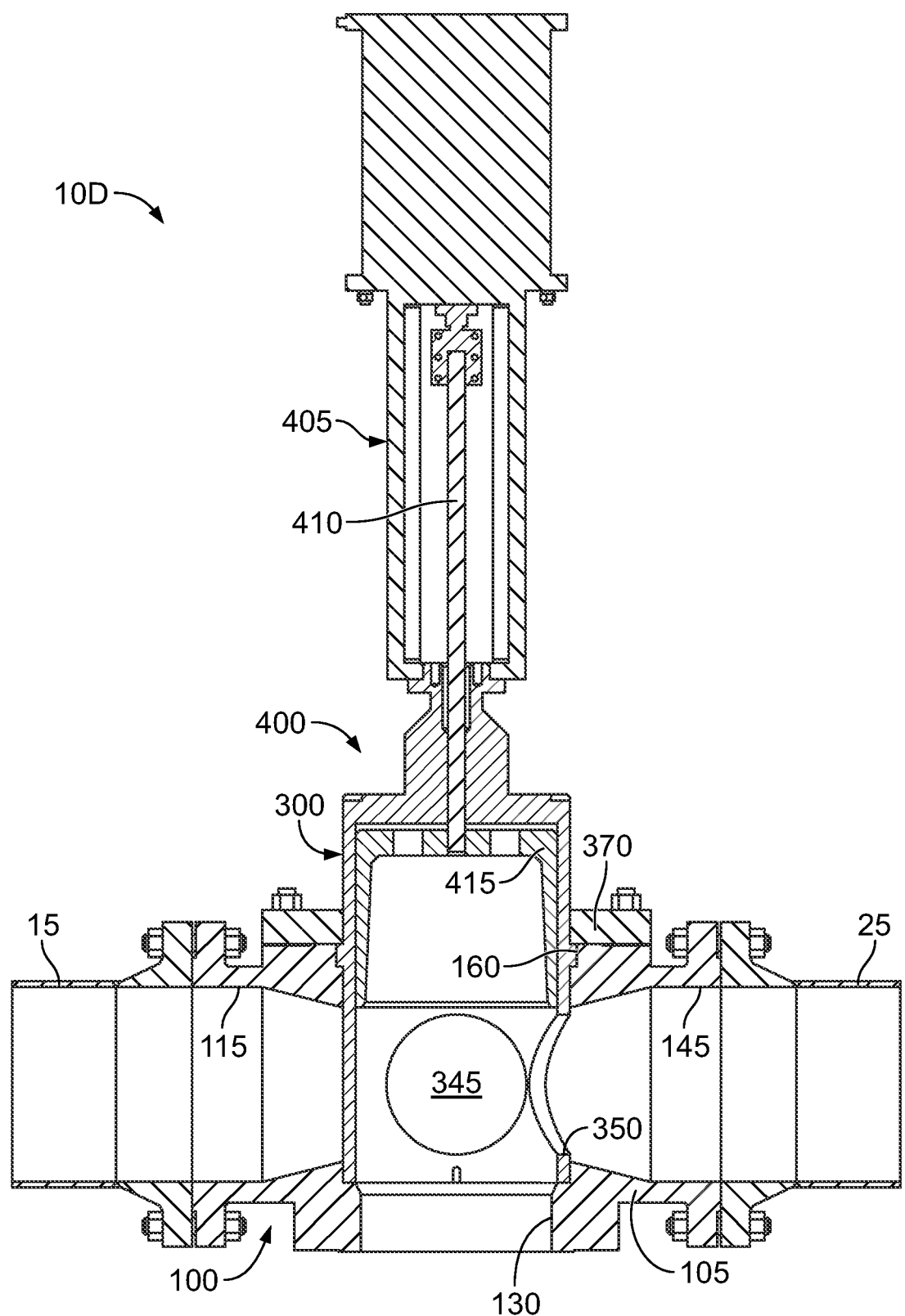
FIG. 7 is a side cross-sectional view of a fourth example pipe cleaning assembly including the connection fixture of FIG. 1 and the bonnet of FIG. 3.

Referring to FIG. 7, a fourth example pipe cleaning assembly 10D is shown that uses connection fixture 100 and bonnet assembly 400 and can be used to clean the downstream piping of the piping system. In pipe cleaning assembly 10D, bonnet 300 of bonnet assembly 400 is inserted through second auxiliary aperture 160 of connection fixture 100, is positioned within cavity 110 of body 105, and is secured in place by ring plate 370, as described above. Bonnet 300 is positioned in a third position such that third opening 350 is generally aligned with second aperture 145, first opening 340 and second opening 345 are blocked by body 105, and open first end 310 is generally aligned with first auxiliary aperture 130. Positioning bonnet 300 in the third position creates a third flow path, which allows fluid flow between second aperture 145 and first auxiliary aperture 130 and prevents fluid flow to first aperture 115 and second auxiliary aperture 160.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300 such that valve plug 415 is movable within bonnet 300, as described above. Actuator 405 is mounted to bonnet 300 such that actuator shaft 410 extends through opening 335 and actuator shaft 410 is secured to valve plug 415 to move valve plug 415 within bonnet 300. Bonnet 300 is installed through second auxiliary aperture 160 and into cavity 110 of body 105 and is positioned in the third position such that bonnet 300 directs fluid between second aperture 145 and first auxiliary aperture 130 and prevents fluid flow to first aperture 115 and second auxiliary aperture 160. Ring plate 370 is connected to body 105 to secure bonnet 300 within connection fixture 100. If already installed, threaded members 35 can be loosened, without removing ring plate 370, bonnet 300 is then rotated within connection fixture 100 to the third position, without removing bonnet 300 from the connection fixture 100, and threaded members 35 are tightened secure ring plate 370 and position bonnet 300 in the third position. Valve plug 415 can be moved to the second (closed) position until a pressure within the piping system reaches a predetermined pressure. Once the predetermined pressure has been reached, valve plug 415 can be moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 8A:
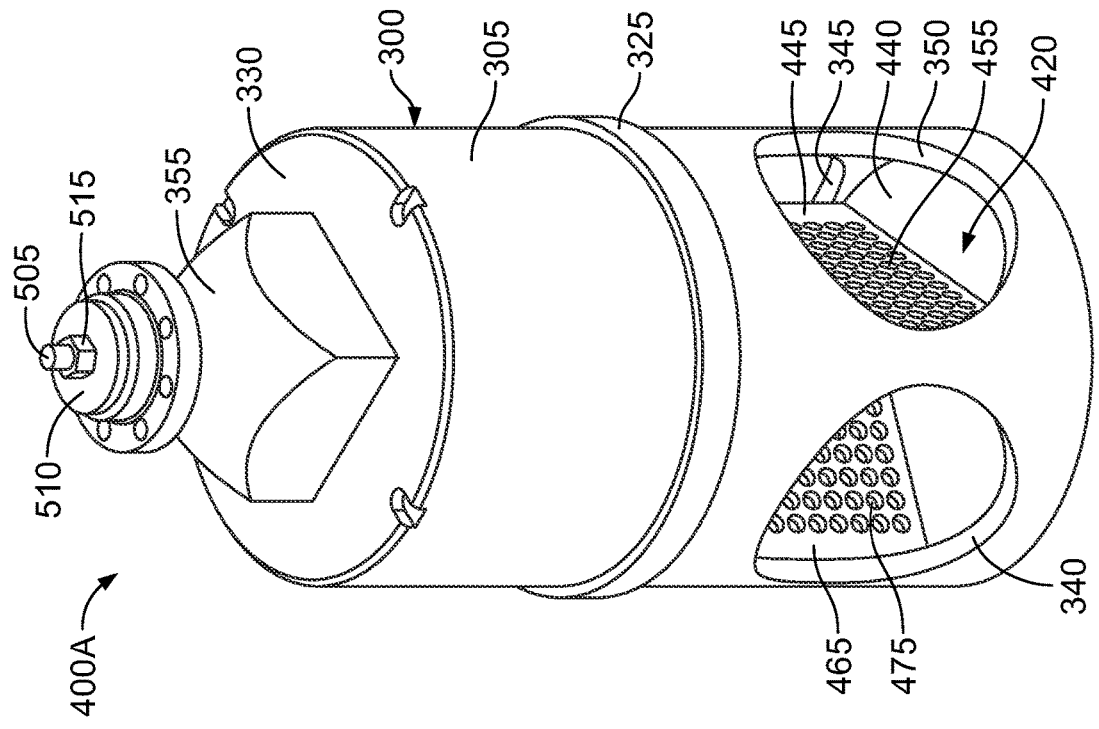
FIGS. 8A and 8B are perspective views of the bonnet of FIG. 3 and a filter assembly that can be used with the connection fixture of FIG. 1.
Figure 8B:
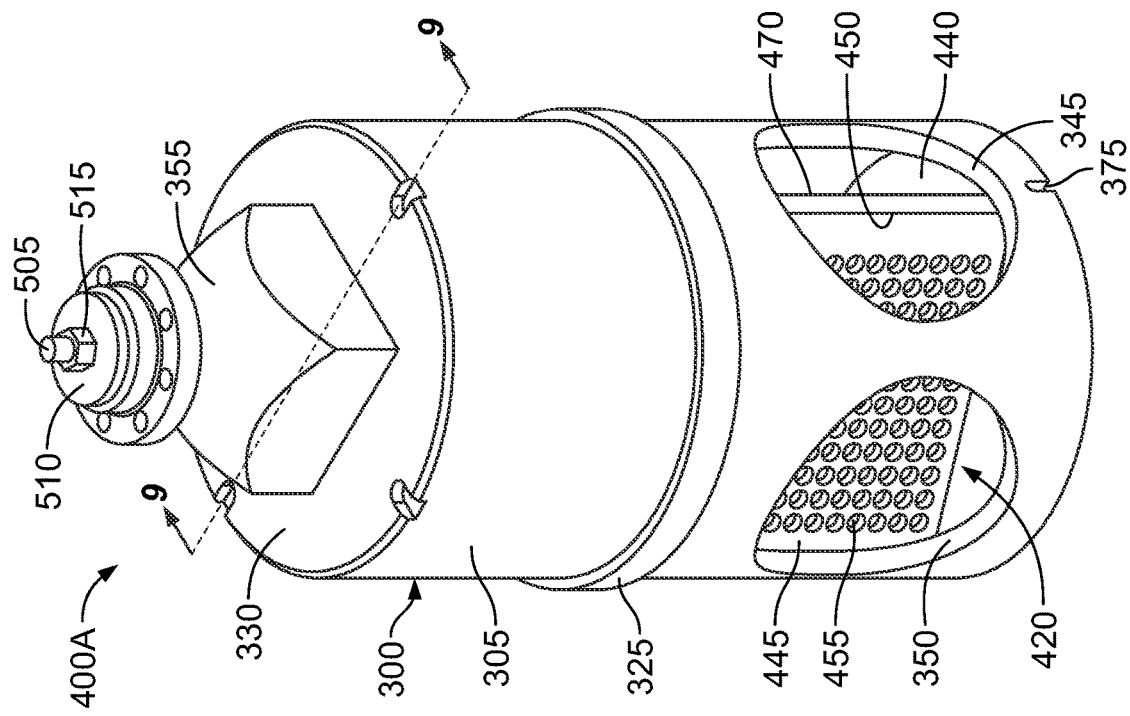
Figure 9:
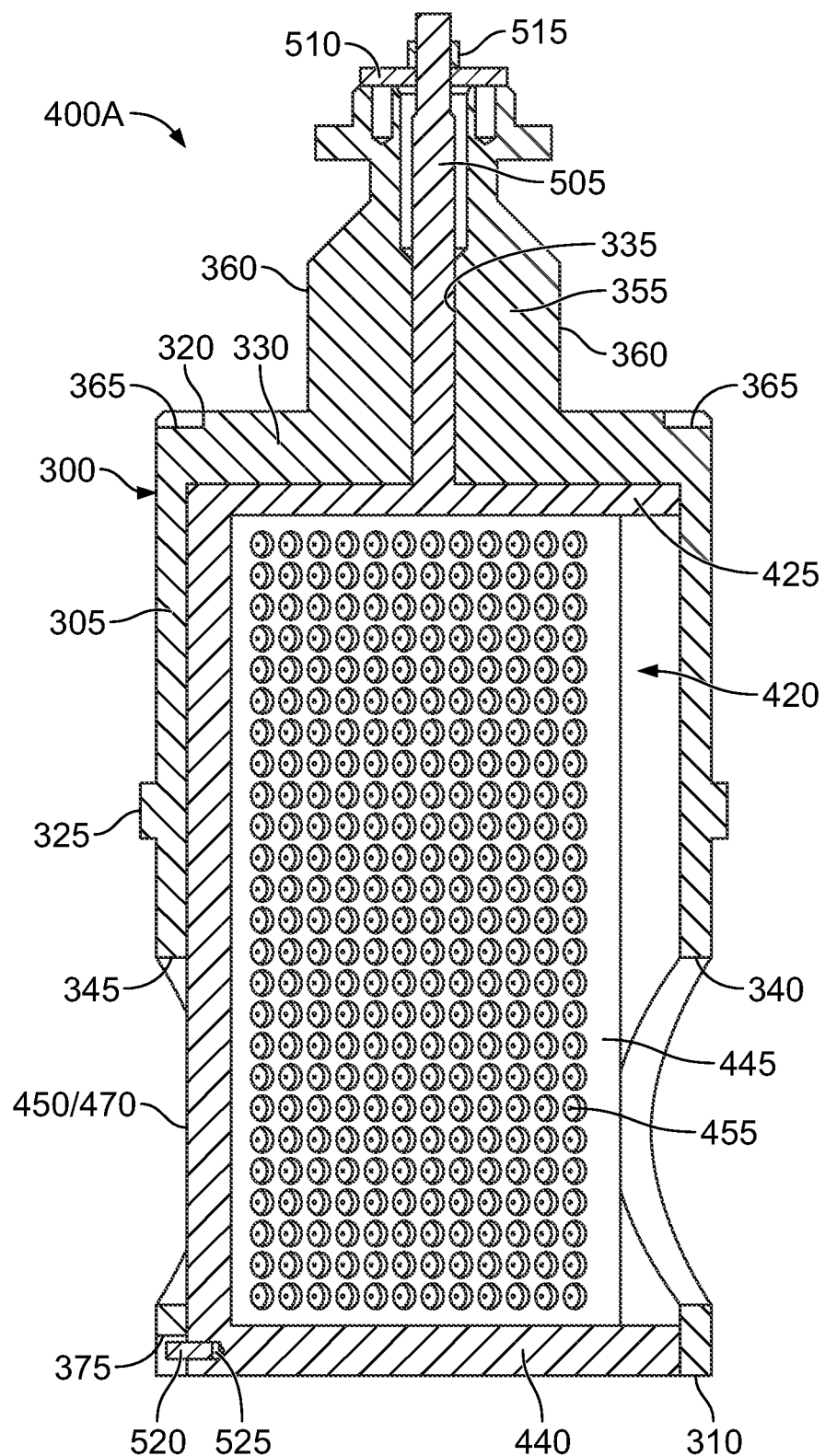
FIG. 9 is a cross-sectional view of the bonnet and filter assembly of FIGS. 8A and 8B taken along line 9-9 in FIG. 8A.
Figure 10:
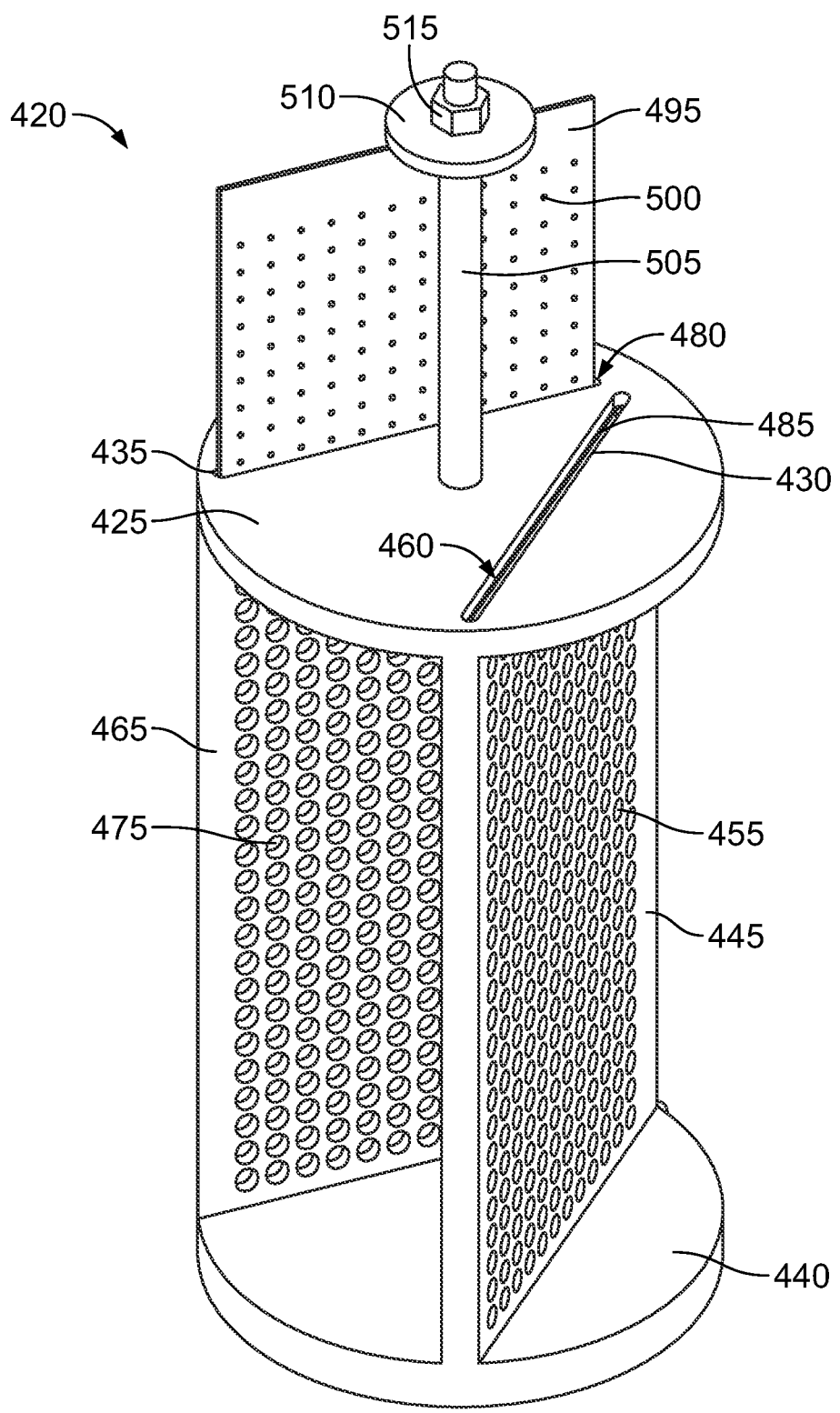
FIG. 10 is a perspective view of the filter assembly of FIGS. 8A and 8B.

Referring to FIGS. 8A, 8B, and 9, another example bonnet assembly 400A is shown that includes bonnet 300 and filter assembly 420 positioned within bonnet 300, and can be used to filter the fluid flow through connection fixture 100 to capture debris flowing through the piping system. Filter assembly 420 is ruggedly constructed to withstand debris impacts and differential pressure from fluid flow through bonnet assembly 400A and the height of filter assembly 420 can be increased or decreased as desired to provide a desired flow capacity. As can be seen in FIG. 10, filter assembly 420 generally includes a top plate 425, a bottom plate 440 opposite and generally parallel to top plate 425, and first and second walls 445, 465 that extend between top plate 425 and bottom plate 440. In the example shown, top plate 425 and bottom plate 440 are preferably cylindrical to fit within bonnet 300 and first and second walls 445, 465 are preferably planar. A longitudinal edge 450 of first wall 445 is adjacent and coincident with a longitudinal edge 470 of second wall 465 and second wall 465 extends away from first wall 445 at an angle $\alpha$ to form a "V" shape such that fluid flow between first aperture 115 and second aperture 145 flows through first wall 445 or second wall 465, when aligned as discussed below.

First wall 445 has first apertures 455 formed therethrough to allow fluid flow through first wall 445, while catching debris that is larger than first apertures 455, and is hollow to form a first cavity 460. An optional first filter screen 485 can be positioned in first cavity 460 and can be inserted and removed from first cavity 460 through a first slot 430 in top plate 425 that is aligned with first cavity 460. First filter screen 485 has apertures that are preferably smaller than first apertures 455 in first wall 445 to provide a finer filtering of the fluid flow through first wall 445. Similarly, second wall 465 has second apertures 475 formed therethrough to allow fluid flow through second wall 465, while catching debris that is larger than second apertures 475, and is also hollow to form a second cavity 480. An optional second filter screen 495 can be positioned in second cavity 480 and can be inserted and removed from second cavity 480 through a second slot 435 in top plate 425 that is aligned with second cavity 480. Second filter screen 495 has apertures 500 that are preferably smaller than second apertures 475 in second wall 465 to provide a finer filtering of the fluid flow through second wall 465. A closed piping system can be progressively cleaned to finer levels by using finer first and second filter screen 485, 495 and inspection of the debris caught by first and second filter screen 485, 495 allows a user to determine the cleanliness of the piping system.

As best seen in FIG. 9, filter assembly 420 can also include a stem 505 that extends from top plate 425 and through opening 335 in end wall 330 and protrusion 355 of bonnet 300, which allows filter assembly 420 to be used with bonnet 300, while providing a surface for packing to engage to seal opening 335. To retain filter assembly 420 in bonnet 300, a plate 510 is positioned on stem 505, adjacent bonnet 300, and a nut 515 is threaded onto stem 505. To rotationally position filter assembly 420 correctly within bonnet 300, a pin 520 can be inserted into and extend from an aperture 525 in filter assembly 420 and can be fitted into a slot 375 formed in bonnet 300. Aligning filter assembly 420 in bonnet 300 in this manner ensures that the entire fluid flow through bonnet 300 in the first or fourth positions will pass through filter assembly 420.

Figure 11:
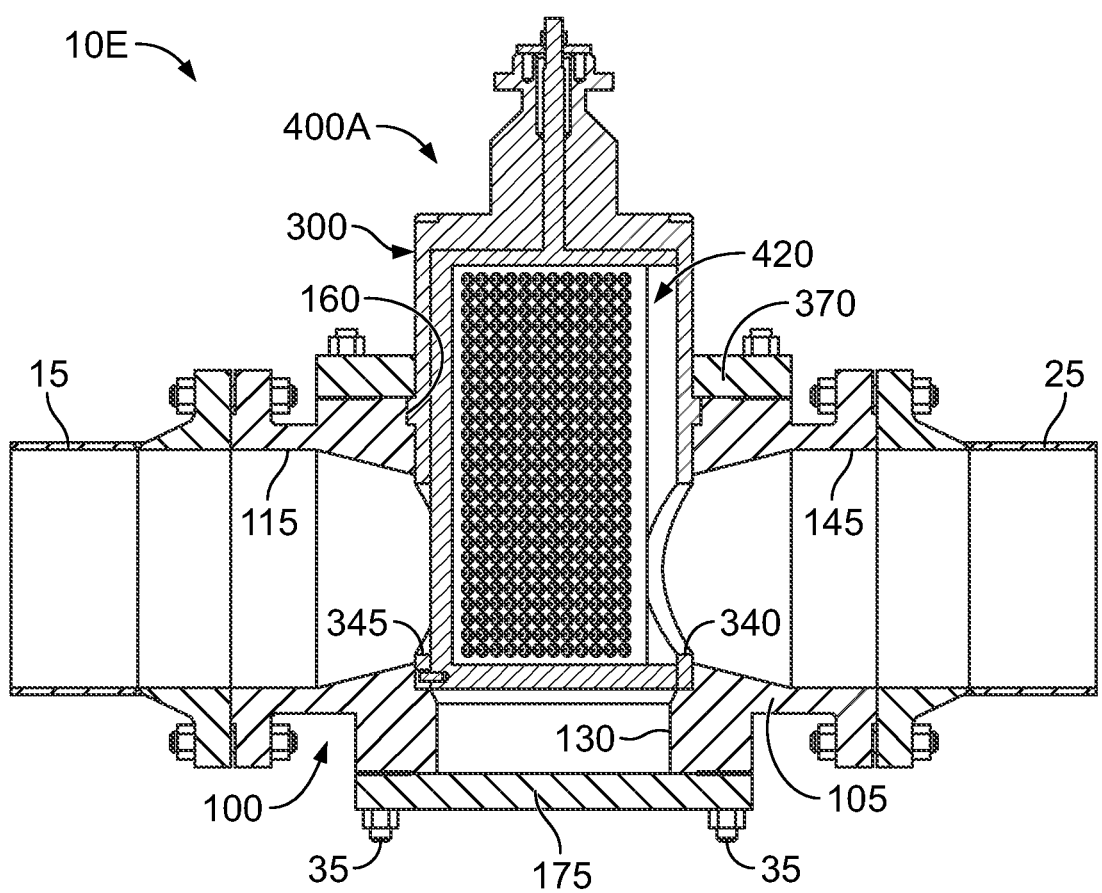
FIG. 11 is a side cross-sectional view of a fifth example pipe cleaning assembly including the connection fixture of FIG. 1 and the bonnet and filter assembly of FIGS. 8A and 8B.
Figure 12:
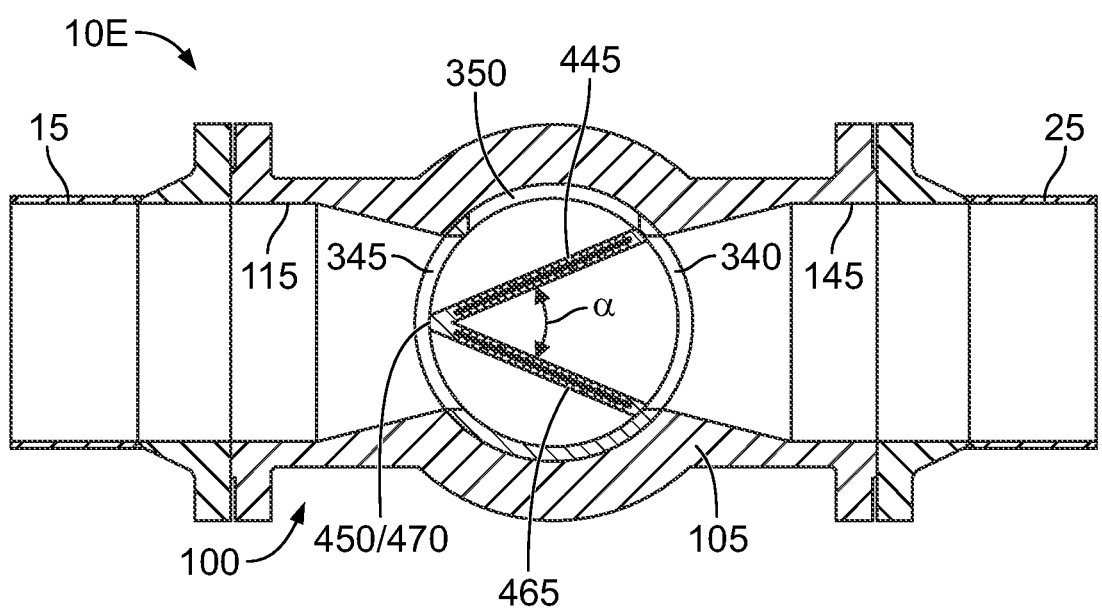
FIG. 12 is a top cross-sectional view of the pipe cleaning assembly of FIG. 11.

Referring to FIGS. 11 and 12, a fifth example pipe cleaning assembly 10E is shown that uses connection fixture 100 and a bonnet assembly 400A and can be used to clean the piping system and filter the fluid flow through the piping system. In pipe cleaning assembly 10E, bonnet 300 of bonnet assembly 400A is inserted through second auxiliary aperture 160 of connection fixture 100, is positioned within cavity 110 of body 105, and is secured in place by ring plate 370, as described above. Bonnet 300 can be positioned in the first position such that second opening 345 is generally aligned with first aperture 115, first opening 340 is generally aligned with second aperture 145, third opening 350 is blocked by body 105, and open first end 310 is generally aligned with first auxiliary aperture 130, which creates the first flow path, which allows fluid flow between first aperture 115 and second aperture 145 and prevents fluid flow through second auxiliary aperture 160. First plate 175 is also secured to connection fixture 100 over first auxiliary aperture 130 to prevent fluid flow through first auxiliary aperture 130.

Positioning bonnet assembly 400A in the first position, as described above, allows filter assembly 420 to capture debris in the fluid flow in first and second walls 445, 465 and first and second filter screens 485, 495, if used. If desired, once the debris has been captured, bonnet assembly 400A can be removed from connection fixture 100 and cleaned or bonnet assembly 400A can be rotated 180 degrees and the fluid flow will then flush the debris out of filter assembly 420.

In the configuration described above, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. If desired, first filter screen 485 can be positioned in first cavity 460 of first wall 445 through first slot 430 and second filter screen 495 can be positioned in second cavity 480 of second wall 465 through second slot 435. Filter assembly 420 is installed within bonnet 300 such that pin 520 extends from filter assembly 420 and into slot 375 in bonnet 300 to align filter assembly 420 and stem 505 of filter assembly 420 extends through opening 335 in bonnet 300, as described above. Bonnet 300 is installed through second auxiliary aperture 160 and into cavity 110 of body 105 and is positioned in the first position such that bonnet 300 directs fluid between first aperture 115 and second aperture 145 and prevents fluid flow to second auxiliary aperture 160. First plate 175 is positioned over first auxiliary aperture 130 and connected to body 105 to seal first auxiliary aperture 130. Ring plate 370 is connected to body 105 to secure bonnet 300 within connection fixture 100. If already installed, threaded members 35 can be loosened, without removing ring plate 370, bonnet 300 is then rotated within connection fixture 100 to the first position, without removing bonnet 300 from the connection fixture 100, and threaded members 35 are tightened secure ring plate 370 and position bonnet 300 in the first position. Once the cleaning is complete, connection fixture 100 can be removed and the control valve can be installed between first pipe section 15 and second pipe section 25. This process allows the piping system to be cleaned without risking wear or damage to the control valve during the cleaning process.

While various embodiments have been described above, this disclosure is not intended to be limited thereto. Variations can be made to the disclosed embodiments that are still within the scope of the appended claims.

What is claimed is:

1. A pipe cleaning assembly, comprising:
a connection fixture comprising a body defining a cavity, a first aperture in fluid communication with the cavity, a first connection flange extending from and surrounding the first aperture, an opposing second aperture in fluid communication with the cavity and coaxially aligned with the first aperture, a second connection flange extending from and surrounding the second aperture, a first auxiliary aperture in fluid communication with the cavity, and an opposing second auxiliary aperture in fluid communication with the cavity and coaxially aligned with the first auxiliary aperture;
a rotatable bonnet inserted through the second auxiliary aperture, positioned within the cavity of the body, and accessible from outside the connection fixture, the bonnet including a generally cylindrical wall having an open first end and a second end, an end wall at the second end of the cylindrical wall, and a plurality of openings formed through the cylindrical wall to direct fluid flowing through the connection fixture;
an actuator mounted to the bonnet and having an actuator shaft that extends through an opening in the end wall of the bonnet; and
a valve plug secured to the actuator shaft and positioned within the bonnet such that the valve plug is movable within the bonnet between a first position, in which the valve plug allows fluid flow through the bonnet, and a second position, in which the valve prevents fluid flow through the bonnet; and
further wherein the bonnet is rotatable between a plurality of positions to create a plurality of different flow paths, the flow paths comprising:
a first flow path in which the bonnet allows fluid flow between the first aperture and the second aperture;
a second flow path in which the bonnet allows fluid flow between the first aperture and the first auxiliary aperture and prevents fluid flow to the second aperture; and
a third flow path in which the bonnet allows fluid flow between the second aperture and the first auxiliary aperture and prevents fluid flow to the first aperture.

2. The pipe cleaning assembly of claim 1, comprising a plate secured to the connection fixture over the first auxiliary aperture to prevent fluid flow through the first auxiliary aperture, wherein the bonnet is positioned to direct fluid between the first aperture and the second aperture and prevent fluid flow through the second auxiliary aperture.

3. The pipe cleaning assembly of claim 1, wherein the bonnet is positioned to direct fluid between the first aperture, the second aperture, and the first auxiliary aperture and prevent fluid flow through the second auxiliary aperture.

4. The pipe cleaning assembly of claim 1, wherein the bonnet is positioned to direct fluid between the second aperture and the first auxiliary aperture and prevent fluid flow through the first aperture and the second auxiliary aperture.

5. The pipe cleaning assembly of claim 1, wherein the bonnet is rotatable within the connection fixture to select a flow path without removing the bonnet from the connection fixture.

6. The pipe cleaning assembly of claim 5, wherein the end wall of the bonnet is configured to receive a tool to rotate the bonnet.

7. The pipe cleaning assembly of claim 6, wherein the end wall comprises a protrusion having opposing, parallel, planar sides to receive the tool.

8. A pipe cleaning assembly, comprising:
a connection fixture comprising a body defining a cavity, a first aperture in fluid communication with the cavity, a first connection flange extending from and surrounding the first aperture, an opposing second aperture in fluid communication with the cavity and coaxially aligned with the first aperture, a second connection flange extending from and surrounding the second aperture, a first auxiliary aperture in fluid communication with the cavity, and an opposing second auxiliary aperture in fluid communication with the cavity and coaxially aligned with the first auxiliary aperture;
a rotatable bonnet inserted through the second auxiliary aperture, positioned within the cavity of the body, and accessible from outside the connection fixture, the bonnet including a generally cylindrical wall having an open first end and a second end, an end wall at the second end of the cylindrical wall, and a plurality of openings formed through the cylindrical wall to direct fluid flowing through the connection fixture;
an actuator mounted to the bonnet and having an actuator shaft that extends through an opening in the end wall of the bonnet; and
a valve plug secured to the actuator shaft and positioned within the bonnet such that the valve plug is movable within the bonnet between a first position, in which the valve plug allows fluid flow through the bonnet, and a second position, in which the valve prevents fluid flow through the bonnet; and
further wherein the plurality of openings include only a first opening having a first axis, an opposing second opening having a second axis coaxially aligned with the first axis of the first opening, and a third opening having a third axis perpendicular to the first axis and the second axis.

9. The pipe cleaning assembly of claim 8, comprising a plate secured to the connection fixture over the first auxiliary aperture to prevent fluid flow through the first auxiliary aperture, wherein the bonnet is positioned to direct fluid between the first aperture and the second aperture and prevent fluid flow through the second auxiliary aperture.

10. The pipe cleaning assembly of claim 8, wherein the bonnet is positioned to direct fluid between the first aperture, the second aperture, and the first auxiliary aperture and prevent fluid flow through the second auxiliary aperture.

11. The pipe cleaning assembly of claim 8, wherein the bonnet is rotatable within the connection fixture to select a flow path without removing the bonnet from the connection fixture, and wherein the end wall of the bonnet is configured to receive a tool to rotate the bonnet.

12. A pipe cleaning assembly, comprising:
a connection fixture comprising a body defining a cavity, a first aperture in fluid communication with the cavity, a first connection flange extending from and surrounding the first aperture, an opposing second aperture in fluid communication with the cavity and coaxially aligned with the first aperture, a second connection flange extending from and surrounding the second aperture, a first auxiliary aperture in fluid communication with the cavity, and an opposing second auxiliary aperture in fluid communication with the cavity and coaxially aligned with the first auxiliary aperture;
a rotatable bonnet inserted through the second auxiliary aperture, positioned within the cavity of the body, and accessible from outside the connection fixture, the bonnet including a generally cylindrical wall having an open first end and a second end, an end wall at the second end of the cylindrical wall, and a plurality of openings formed through the cylindrical wall to direct fluid flowing through the connection fixture;
an actuator mounted to the bonnet and having an actuator shaft that extends through an opening in the end wall of the bonnet; and
a valve plug secured to the actuator shaft and positioned within the bonnet such that the valve plug is movable within the bonnet between a first position, in which the valve plug allows fluid flow through the bonnet, and a second position, in which the valve prevents fluid flow through the bonnet; and
further wherein the bonnet is positioned to direct fluid between the first aperture and the first auxiliary aperture and prevent fluid flow through the second aperture and the second auxiliary aperture.

13. The pipe cleaning assembly of claim 12, comprising a plate secured to the connection fixture over the first auxiliary aperture to prevent fluid flow through the first auxiliary aperture, wherein the bonnet is positioned to direct fluid between the first aperture and the second aperture and prevent fluid flow through the second auxiliary aperture.

14. The pipe cleaning assembly of claim 12, wherein the bonnet is positioned to direct fluid between the first aperture, the second aperture, and the first auxiliary aperture and prevent fluid flow through the second auxiliary aperture.

15. The pipe cleaning assembly of claim 12, wherein the bonnet is rotatable within the connection fixture to select a flow path without removing the bonnet from the connection fixture, and wherein the end wall of the bonnet is configured to receive a tool to rotate the bonnet.

* * * * *

UNITED STATES PATENT AND TRADEMARK OFFICE
CERTIFICATE OF CORRECTION

PATENT NO. : 11,850,636 B2
APPLICATION NO. : 17/111182
DATED : December 26, 2023
INVENTOR(S) : Michel K. Lovell Page 1 of 1

It is certified that error appears in the above-identified patent and that said Letters Patent is hereby corrected as shown below:

In the Specification

Column 4, Line 45, "use of" should be -- use --.

Column 5, Line 64, "it" should be -- in --.

Column 6, Line 12, "(Cu)" should be -- ($C_v$) --.

Column 7, Line 26, "improved" should be -- improve --.

Column 9, Line 9, "depressurized" should be -- depressurize --.

Signed and Sealed this
Twenty-ninth Day of April, 2025

Coke Morgan Stewart
*Acting Director of the United States Patent and Trademark Office*